United States Patent [19]

Thome

[11] 4,072,828
[45] Feb. 7, 1978

[54] ROTATIVE WELDING GUN

[75] Inventor: Paul Thome, Saint-Cloud, France

[73] Assignee: Mecazo, Feuquieres en Vimeu, France

[21] Appl. No.: 749,500

[22] Filed: Dec. 10, 1976

[30] Foreign Application Priority Data

Dec. 10, 1975 France .................................. 75 37801

[51] Int. Cl.² ............................................. B23K 9/12
[52] U.S. Cl. ........................... 219/137.31; 219/60 A
[58] Field of Search ............ 219/124, 125 R, 125 PL, 219/60 A

[56] References Cited

U.S. PATENT DOCUMENTS

| 3,396,263 | 8/1968 | Even | 219/125 R X |
|---|---|---|---|
| 3,621,182 | 11/1971 | Peyrot | 219/125 R |

Primary Examiner—E. A. Goldberg
Attorney, Agent, or Firm—Burgess, Dinklage & Sprung

[57] ABSTRACT

A small volume rotative welding gun comprises a welding torch which is adjustable both radially and angularly with respect to a movable block, a flat torque motor and a movable block having an accessible front portion carrying the welding torch so as to put same in alignment with a workpiece to be welded. A rear portion of the block passes through the flat motor and is connected to the motor rotor and is provided with axially extending electric wires. The block has a cooling fluid inlet and an inlet for a protective gas flow, both of the inlets being co-axial with said electric wires, and an insulating member. Also provided is a body in which the flat motor is fixed which comprises a device for measuring rotations, liquid metal or carbon electric contacts, bearings for centering the movable block, a protective hood, and gas and current stationary outlets. A ring is further provided for fixing the body to a support member for positioning the gun comprising a device for axially adjusting the gun.

11 Claims, 15 Drawing Figures

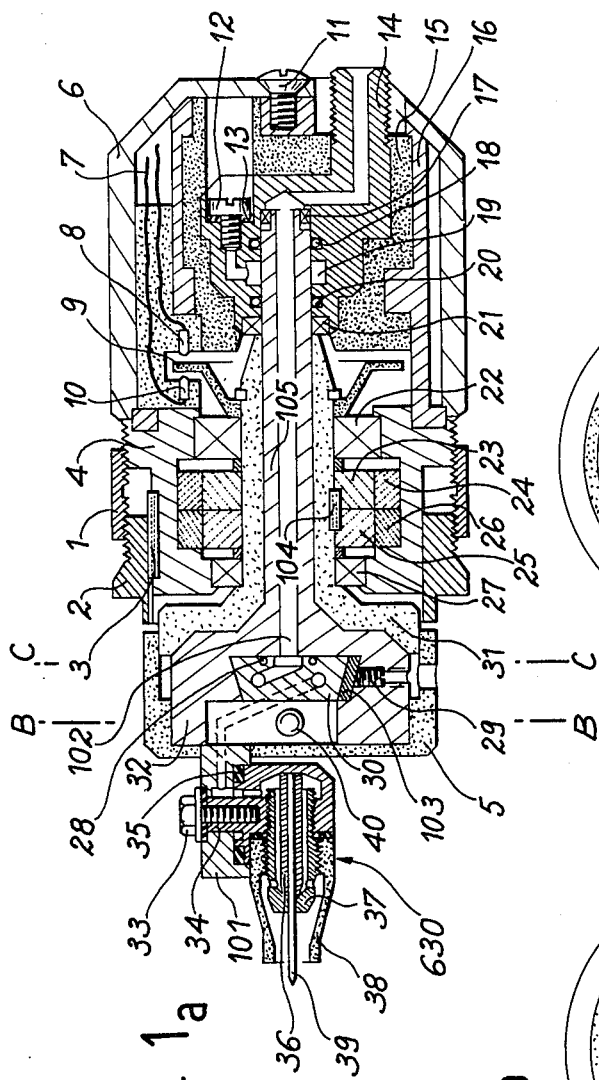
FIG. 1a
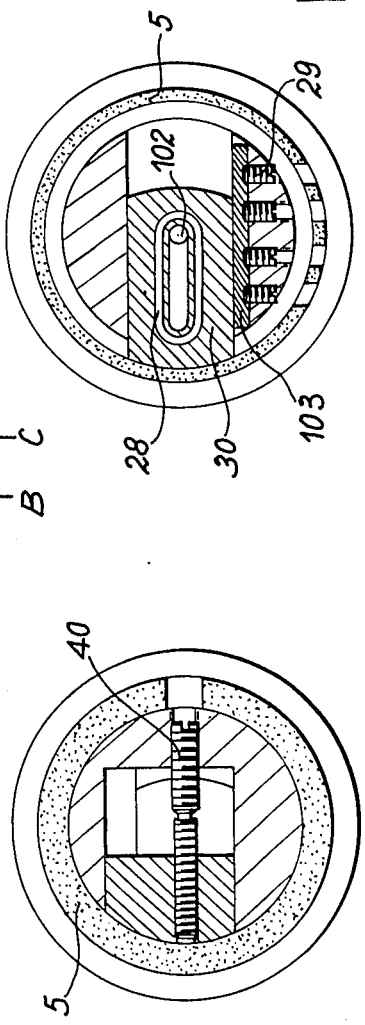
FIG. 1b
FIG. 1c

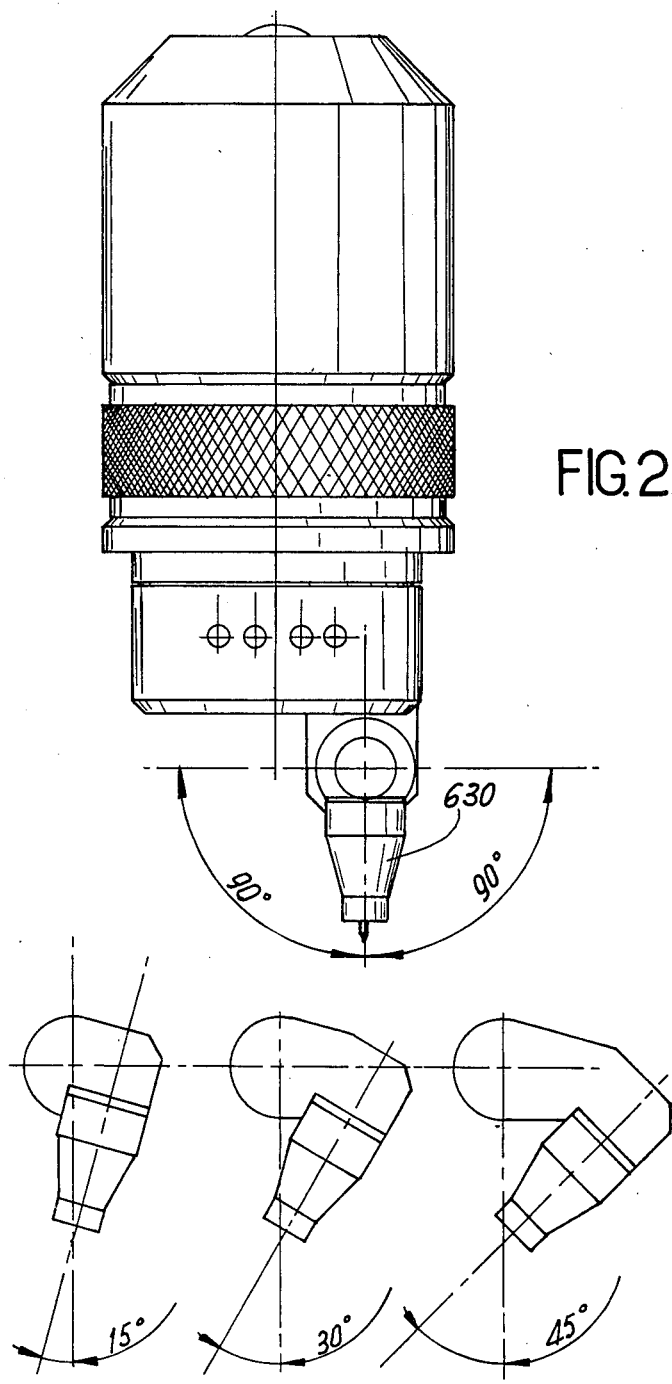
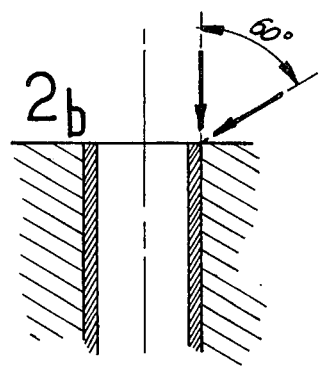
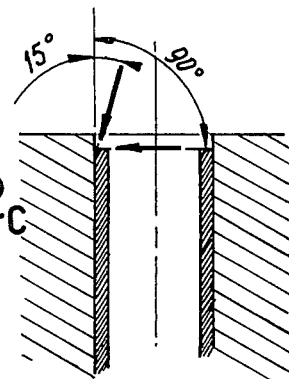
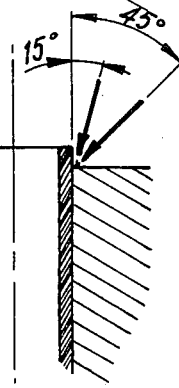

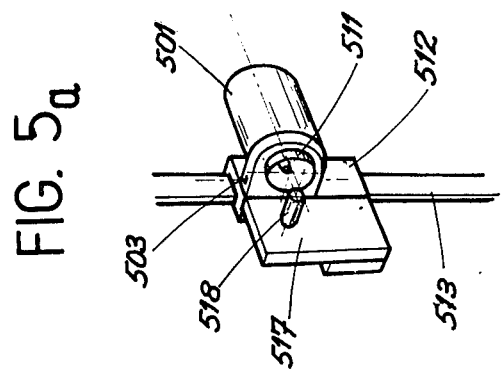
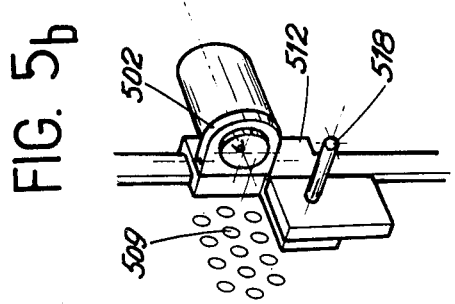
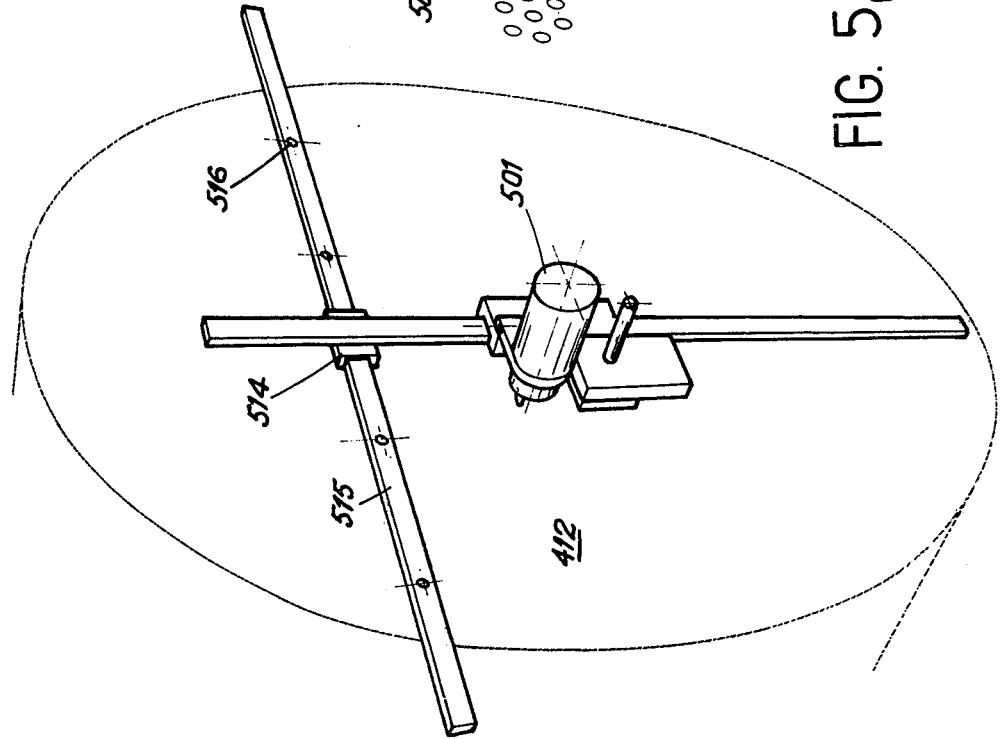

ROTATIVE WELDING GUN

The present invention relates to a rotative welding gun adapted to make circular welds of various types. In particular, the manufacture of heat exchangers involves the welding of a large number of tubes to a common plate. Now, welds can have various configurations and can be, e.g., butt-welds, in which case the welding torch is at right angles to the tube plate, or welds for which the welding torch is inclined with respect to the tubes and my extend beyond said plate; moreover, the tubes can have various diameters according to the exchanger concerned. Accordingly, it may be convenient to be able to carry out an axial adjustment of the welding torch position, as well as an adjustment of its inclination. In addition, the welding gun, of necessity, has to be well centered with respect to the weld to be made, with an accuracy of about one tenth of a millimiter. Various devices of that type have been on the market for many years. In such devices, the gun usually comprises an axial chuck mounted inside the welding tube, and the welding torch is driven rotatively either by a motor mounted at one end of the welding gun, or through transmission means from a motor separate from the gun proper. However, all such devices are rather cumbersome and not easy to handle with respect to the tube plates of heat exchangers.

The aim of the present invenion is to improve the design of automatic welding guns, by improving their reliability, on the one hand, and by reducing their overall size so as to obtain small and compact articles, on the other hand.

The object of the invention is also to render the processing cycle much simpler with a view to mass production.

Preferably, a welding gun according to the invention comprises a movable front portion to be placed directly facing the weld to be made, with the centering device being eliminated from the gun proper and transferred to another portion. Said front portion carries a removable welding torch with its protective nozzle, the torch being water- or gas cooled and fed by a gas flow. The various connections are effected by merely fixing said torch. The latter can be either a torch with an electrode for arc-welding (T.I.G. torch) or a plasma torch. The driving device comprises a flat motor through which passes the rear extension of the front portion. A centering device in association with a telescopic, retractable or removable finger makes it possible to carry out positioning operations when substituted for the welding gun.

The invention will be more clearly understood from the following description, with reference to the accompanying drawings, wherein:

FIG. 1a is an axial cross section of a rotative welding gun provided with an argon flow T.I.G. torch, with stationary current and gas inputs in the rear portions of the gun;

FIGS. 1b and 1c are cross sections according to lines BB and CC of FIG. 1a, respectively;

FIG. 2a is a general view of the welding gun;

FIGS. 2b to 2d show examples of welded assemblies;

FIG. 2e shows inclined interchangeable welding torches;

FIGS. 5a to 5c represent an automated device for centering the welding gun on tubes or tube plates, at various operational positions;

Figure 3:
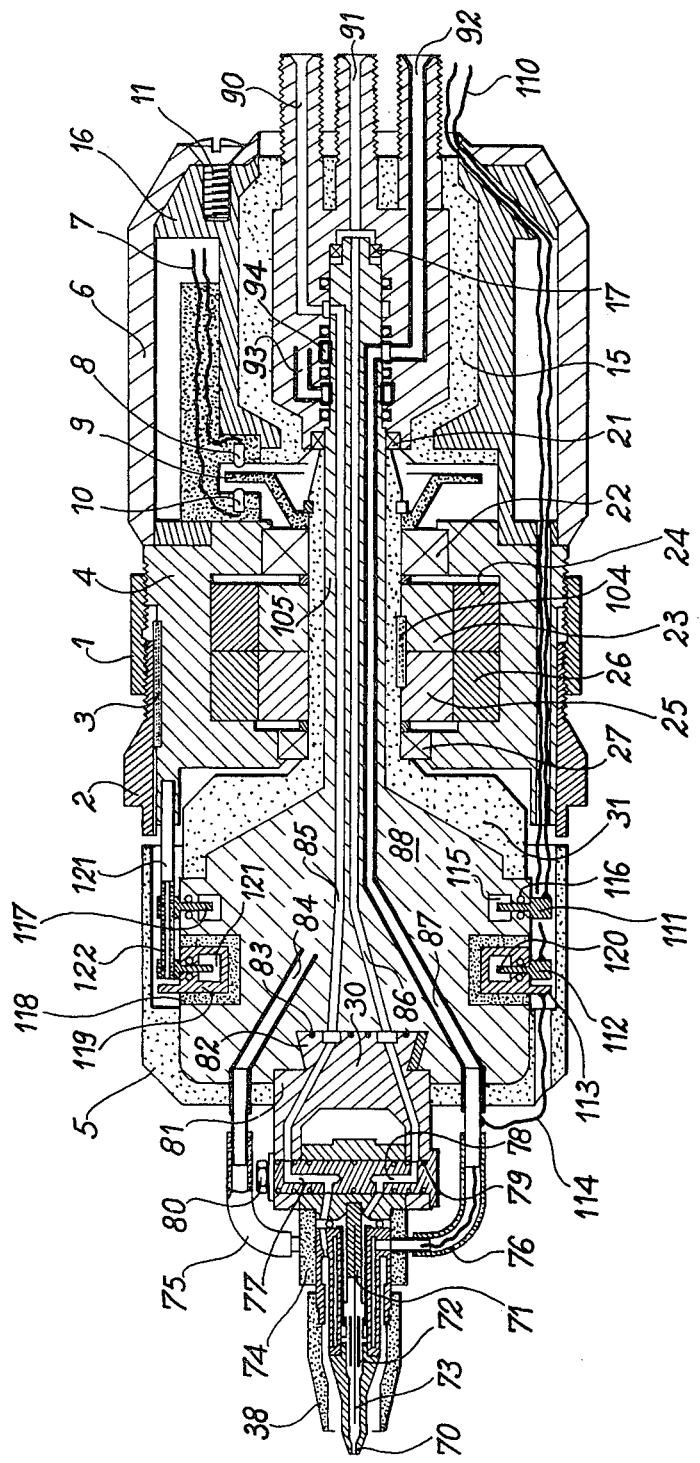
FIG. 3 is an axial cross section of a rotative welding gun equipped with a plasma torch, wherein the stationary current inputs are located on the front part.

Welding torch 630 comprises an electrode 39 of tungsten, an electrode clip 36, a gas diffuser 37 and a ceramic nozzle 38. The torch inclination is adjustable through rotation around screw 33 which ensures its fixation onto torch holder 101. Sealing joints 34 and 35 allow for the delivery of gas for any position of the torch. The torch is easily removed from the gun by merely disengaging screw 33. Torch holder 101 is integral with a groove or carriage 30. The gas (argon) feeding the torch as well as electric current is introduced through part 14, at the rear of the gun. The gas flows through conduit 102 inside the axial rotative body 32 which transmits the electric current. Oblong sealing joint 28 makes it possible to deliver gas whatever the position of the torch holder carriage, said position determining the welding radius and being adjusted by means of screw 40; the carriage is then clamped by means of screws 29 resting on push block 103.

Figure 4:
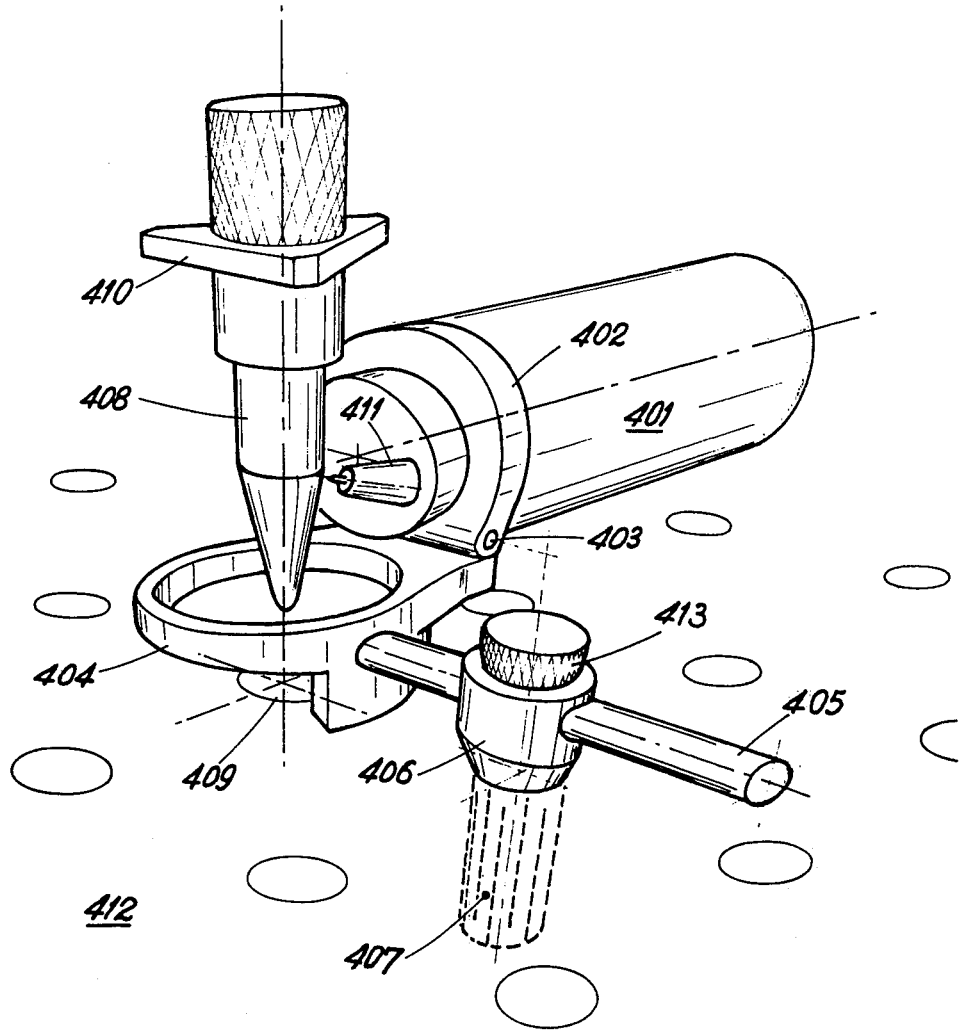
FIG. 4 is a perspective view of a manual centering device.

The middle fixed part of the gun is provided with a setting ring 2 for fixing the gun to a pedestal such as those shown in FIGS. 4 and 5. An axial adjustment ring 1 connects ring 2 to the gun middle portion 4 while a key 3 prevents ring 2 from rotating with respect to the welding gun when ring 1 is caused to turn. Inside the central body 4 a tachometer dynamo is fixed with a stator 24 and a rotor 23, and a motor with a stator 26 and a rotor 25. Bearings 22 and 27 which facilitate the rotation of the movable part are mounted on both sides of the dynamo motor assembly. The motor as well as the dynamo are of the torque motor type, with permanent magnets, and are constituted by flat members, sold in France by ARTUS (Kollmorgen Department) under the trade designation T-1218 according to Inland Motor technical files. Their diameter is substantially larger than their thickness, and the rotor thereof is provided with a comparatively large bore. They also go by the name of "pancake."

The rear portion of the gun is covered with a hood 6 fixed by screw 11 and covering the metal body 16. The latter contains an insulator 15 which covers the gas- and electric current input 14. Metal body 16 has been specially machined so as to leave enough space for mounting a device for measuring the position and the rotation speed of the gun. The latter device contains the following stationary parts: a micro-bulb 10, a photocell 8 which is a bip receiver, electrical inputs 7, and a movable part 9 constituted by a transparent streaked disk, integral with the movements of the torch. The gas and electric current input comprises the following parts: centering bearings 17 and 21, an annular receptacle 19 for a mercury electrical connection, which receptacle is obturated by screw 12 and its joint 13, and sealing joints 18 and 20 for the mercury of the above electrical connection.

The gun movable unit passes through both the flat torque motor and the tachometer dynamo. It is connected to the rotor of the torque motor by means of a key 104. Said gun movable unit comprises a valve shaped metal piece provided with an enlarged front portion 32 for receiving carriage 30, said front portion extending to the rear by a co-axial tube 105 for the supply of gas and electric current. Tube 105 is centered by means of bearings 17 and 21 located at the rear of the gun. The electrical connection is provided by mercury 19. The gun movable unit further comprises an insulating front hood 5, the torch and the torch-holder above mentioned, an insulating member 31 covering the metal part 105, 32 connected to the above key, and also the transparent streaked disk 9 for measuring rotations.

In FIG. 2a the welding gun is shown with its torch 630 capable of tilting up to 90° in both directions with respect to the axis thereof. By merely tilting the torch, it is possible to obtain welds such as shown in FIGS. 2b to 2d. Moreover, FIG. 2e represents torches being tilted at angles of 15°, 30°, and 45°, to allow for welds of very small radius.

FIG. 3 shows another arrangement of the parts of a rotative welding gun according to the invention. This figure shows the centrally mounted setting ring 2 with axial adjustment ring 1, key 3 for preventing ring 2 from rotating, as well as central member 4 in which the tachometer dynamo and the flat torque motor are located. Ring 1 is connected to central member 4.

The dynamo and flat motor have their respective stators 24, 26 and rotors 23, 25 plced between bearings 22 and 27. A device for measuring the rotation of the gun is provided which comprises a bulb 8, a streaked disk 9 integral with movable shaft 105, and a bip receiver photocell 10 fed by wires 7. Hood 6 is fixed to the rear portion of the gun by means of screw 11.

Stationary current feeder inlets 110, electrically insulated water inlet and outlet 92 and 93, and gas supply conduits 90 and 91 for the plasma torch are located at the rear. The fluid inlets are connected to a coaxial central tube through circular chambers insulated by sealed joints 94. The torch is mounted at the front with its nozzle 70, its refractory nozzle 38, an electrode clip 71 and an insulator 74. Said torch is provided with two gas nlets 77 and 78 for welding operations and for the pilot arc, respectively; it may be tilted and is fixed at 80. Joints 79 ensure tightness between the gas circuits whatever the torch inclination. Torch holder 81 is integral with carriage 82, the adjustment of which defines the torch radial extent. Sealing joints 83, of oblong shape, insulate the gas circuits.

The front portion of the gun is provided with an insulating hood 5 and comprises at the front thereof, a solid metal part extending into an axle, or shaft, provided with coaxial conduits for the two gas inlets 85 and 86, and water inlet and outlet 84 and 87. This metal portion 88 is further provided with mercury annular electrical connections. The mercury annular receptacles 115 and 121 comprise joints 116 to keep the mercury from leaking; receptacle 121 is electrically insulated from front portion 88 by member 118; receptacle 115 is at the same potential as portion 88.

Disks 111 and 112 are made integral with the stationary central body by means of axle 121 and its insulating extension 122. The pilot arc is fed with current through terminals 112 and 113 integral with the rotative front portion. An electrically insulating member 118 separates receptacle terminal 119 from front portion 88.

In said embodiment, the electric supply of the pilot arc is contained in return circuit 76 connecting the welding torch with the gun front portion.

Sheets 4 and 5 show the centering device associated with said rotative welding guns. The latter, contrary to most of the welding guns of the prior art, do not have an integrated centering device. Gun 401 is attached by means of its setting ring to member 402 which can pivot around hinge 403 fixed to a centering base 404. In FIG. 4, the centering base is held by an arm 405 passing through core 406 conncted to an expansible chuck 407. By tightening button 413, this expansible chuck, inserted in a tube, and the arm 405 may be locked, thus immobilizing the centering base. The operating steps are as follows: the expansible chuck is first inserted into a tube to be used as a reference, and the adjustment base is manually positioned around this tube by means of a punch 408 which is manually introduced into tube 409 to be welded, said punch permitting, by means of its end plate 410 of triangular shape, to center base 404. Movements are then blocked by button 413, the punch is removed, the welding gun is tipped, and the welding torch 411 is brought exactly into alignment with the joint to be welded. All the welds in tube plate 412 are made in that fashion.

FIG. 5 repesents a centering device similar to the preceding one, but capable of being made fully automatic. Gun 501 with its welding torch 511 is fixed by means of flange 502 pivoting around axle 503. Said flange is held by an L-shaped carriage, or reference base, 512 sliding along ruler 513. The latter is held by carriage 514, sliding along ruler 515. The latter ruler is fixed at 516 to tube plate 412 by means of expansible chucks. Carriage 517 carries punch 518 and is capable of sliding along the L-shaped carriage 512.

In FIG. 5a, the punch is shown inserted into a tube: in such position, reference base 512 is correctly positioned.

Carriages 514 and 512 are then rendered unable to move, 518 is caused to retract, and the punch carriage 517 is then displaced (FIG. 5b), so that it is then possible to cause the welding gun to pivot around welding tube 509.

The welding operation is shown in FIG. 5c. Once the weld has been made, the gun is again caused to pivot and the punch holder is brought back to the position shown in FIG. 5a. The various movable parts are subsequently unlocked, so as to insert the punch into another tube. A new operation cycle can then be started for another weld.

The above centering devices by causing the welding gun to pivot thus complement in simple fashion these apparatuses which, in contradistinction to known devices, are devoid of a separate centering part. They form simple and reliable mechanisms helping to render rotative welding guns much lighter.

Figure 6:
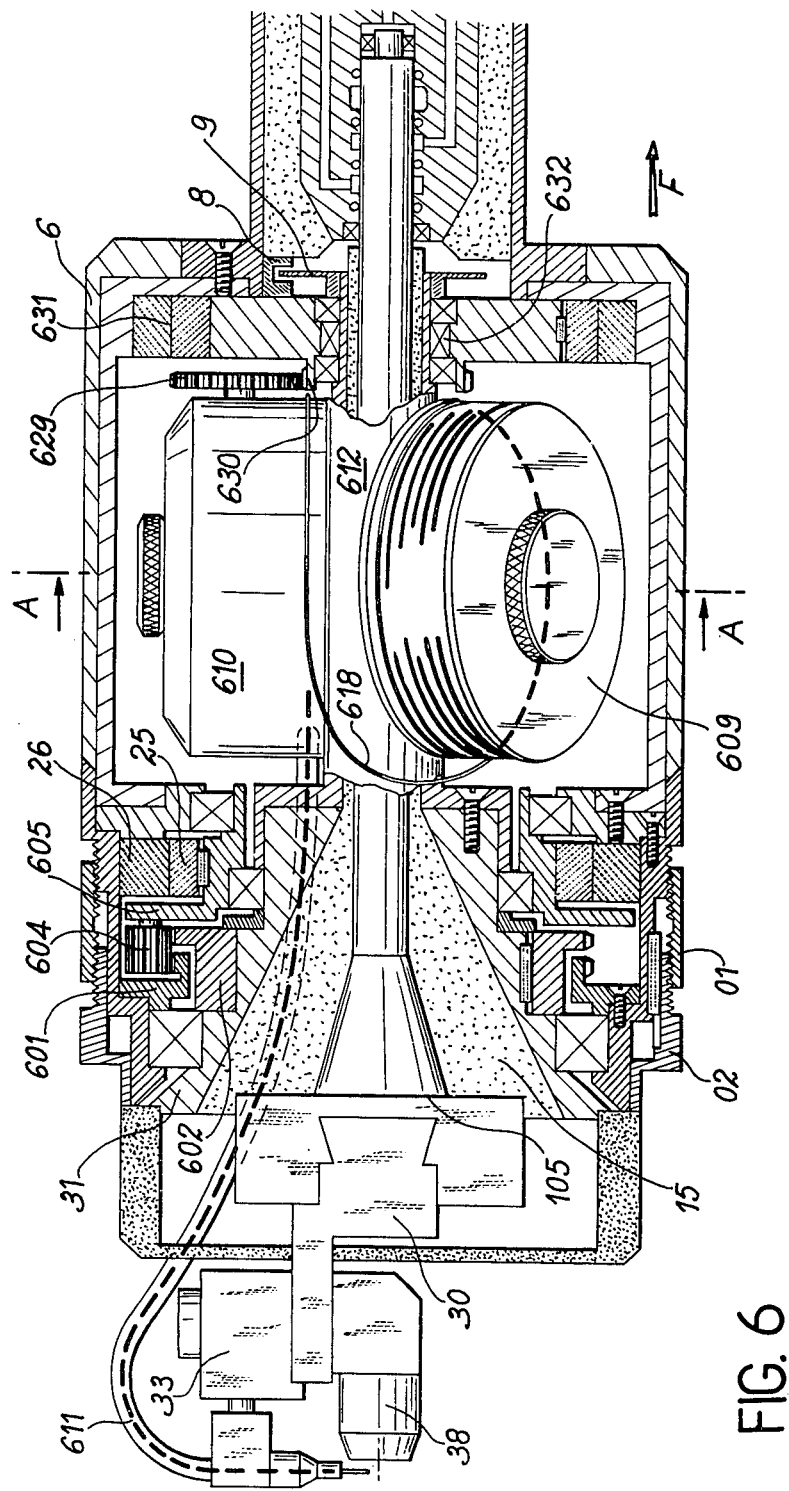
FIG. 6 is a partial axial cross section of an alternative embodiment of the welding gun, provided with a device for feeding a filler metal.
Figure 7:
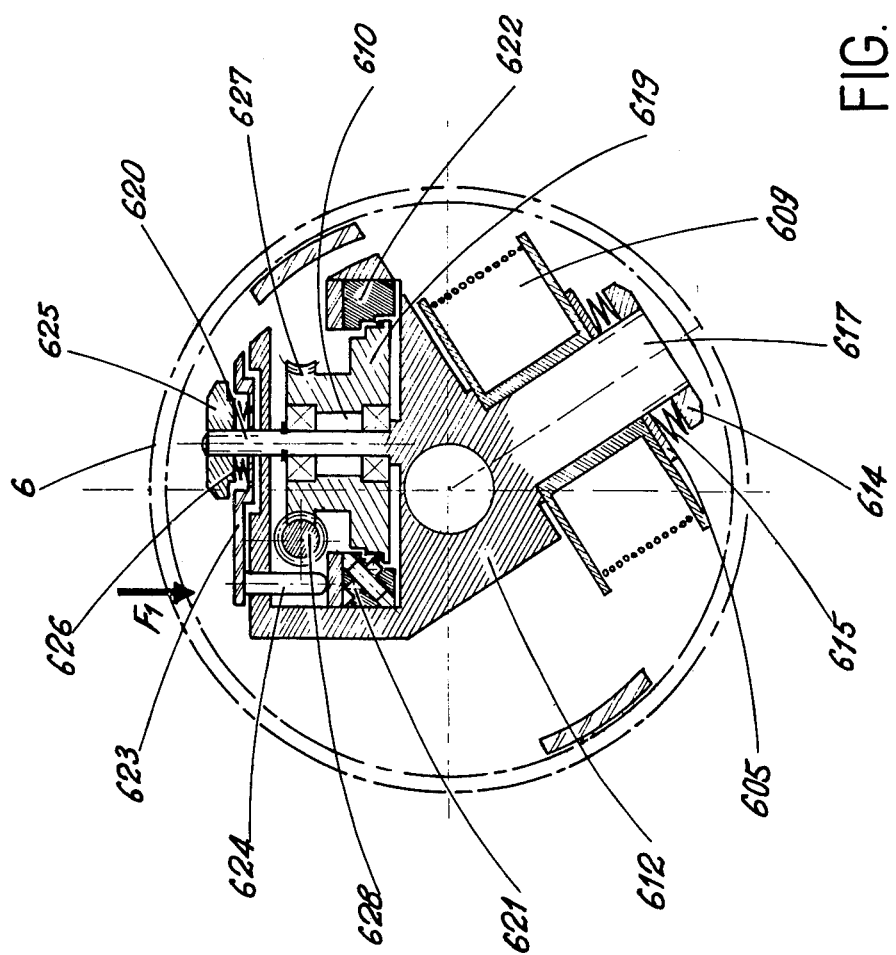
FIG. 7 is a cross section along line AA of FIG. 6.

FIGS. 6 and 7 show a particular arrangement wherein the gun is provided with a device for feeding a filler metal (TIG welding plus a filler metal). The general concept of a series of annular members through which passes the rotative torch holder shaft, or axle, has been retained here. It consists of the annular, flat torque motor for driving torch 38 with its rotor 25 and stator 26, provided with an annular, mechanical speed reducer, on the one hand, and the feed wire driving device controlled by a second annular, flat torque motor 31, on the other hand.

In FIGS. 6 and 7, a stationary, annular gear 601, integral with the welding gun casing, is connected to a movable annular gear 602 keyed to front portion 31 of torch holder shaft, or axle, 105. A planet gear 604 engaged simultaneously with both gears 601 and 602 is fixed to flange 605 keyed to rotor 25 of the motor. Gears 601 and 602 differ from each other by one tooth.

When the planet gear 604 is rotating, it rolls on gears 601 and 602, and whenever gear 604 has performed a full revolution, gear 602 has rotated by one tooth. Such a reducer replaces the tachometer dynamo and permits to obtain an accurate adjustment of low speeds. The measurement of the rotation speeds is realized by a transparent disk 9 integral with torch holder shaft 105 and by a photo captor unit 8, with an electroluminescent diode. Speed measurements are reintroduced, through an analog digital converter, in the form of voltage errors for regulation.

The means for feeding the feed wire comprise spool 609, winder 610 and guide sheath 611, all of which is integral with the movable torch holder shaft, or axle, together with accessory fittings, on the one hand, and an annular driving motor 631, stationary with respect to the body of the gun, on the other hand.

While it rotates together with the torch-holder shaft, the above device for feeding the feed wire has the advantage of being protected by hood 6. For the replacement of spools and the adjustment of the pressure exerted on the winder, it is only necessary to remove hood 6 by pulling it in the direction of arrow F.

Such an operation uncovers the spool and the winder completely so that the operator is allowed free access to the latter, as shown in FIG. 7. Braking of the spool is achieved by the assembly comprising nut 614, spring 615 and washer 616, maintained by axle 617. The filler wire can be unwound as a spiral 618, leaves spool 609, then winds itself around drum 619 of the winder rotating around axle 620. The pressure required for driving drum 619 is exerted by several rollers 621 fixed to sliding block 622. Said pressure is exerted in the direction of arrow F 1 through a platen 623 provided with push rods 624. The pressure is provided and controlled by a nut unit 625 and spring 626 around axle 620.

The rotation of drum 619 comprising a cogged wheel 627 is obtained by means of an endless screw 628 integral with gear 629 engaged with pinion 630 which, in turn, is keyed to the rotor of annular, flat electric motor 631.

Free wheel 632 permits pinion 630 and rotor 631 to be driven by torch holder shaft 105 at the same speed and in the same direction.

In this case, since gears 629 and 630 do not rotate with respect to each other, the feed wire is not caused to unwind. In order to cause the feed wire to unwind, parts 630 and 631 must rotate at speeds higher than that of shaft 3. An electrical servo-device by acting upon the volage feeding rotor 631 keeps the feed wire speed constant whatever the speed of rotation of torch holder shaft 105.

I claim:
1. A rotative welding gun comprising:
 a welding torch adjustably mounted on a movable block and rotatively mounted on a gun body;
 a flat pancake motor with annular stator and rotor members for rotating said movable block with respect to said gun body;
 a front portion of said movable block carrying said torch and being directly exposed outside said body so as to face a workpiece to be welded;
 a rear portion of said movable block passing axially through said annular rotor member of said motor within said body, said rear portion being rigidly connected with said rotor member whereas said stator member of said motor is rigidly connected with said body.

2. A rotating welding gun comprising:
 a welding torch adjustable radially and angularly with respect to a movable block;
 a flat pancake motor for rotating said movable block with respect to a gun body;
 said movable block having an accessible front portion for carrying said welding torch, said front portion being exposed outside said body to face a workpiece to be welded, a rear portion passing through said flat motor and rigidly connected to a rotor of said motor, said rear portion being provided with axially extending electric wires, a cooling fluid inlet and an inlet for a protective gas flow, both of said inlets being coaxial with said electric wires, and an insulating member;
 said body being rigidly connected with a stator of said flat motor, and being provided with a device for measuring rotations, liquid metal or carbon electric contacts, and bearings for centering said movable block;
 said body further comprising a rear protective hood for gas and electric current;
 stationary outlets connected with said wires and inlets of said rear portion.

3. A gun according to claim 2, further comprising:
 a ring for fixing it to a support member for positioning said gun, said ring being provided with a device for axially adjusting said gun.

4. A rotative welding gun, comprising:
 a welding torch adjustable radially and angularly with respect to a movable block, and rotatively mounted with respect to a gun body;
 a flat pancake motor with an associated tachometer dynamo;
 said movable block having an accessible front portion, carrying said welding torch, and exposed outside said body so as to face a workpiece to be welded, and a rear portion passing through said flat motor and rigidly connected to a rotor member of said motor, said front portion being provided with liquid metal rings for conductive connection with stationary electric supply wires;
 said gun being rigidly connected with a stator member of said motor, and having a device for measuring rotations, centering bearings and a protective hood.

5. A gun according to claim 4, further comprising a ring for supporting said body onto a support member for positioning said gun, said ring being provided with a device for axially adjusting said gun.

6. A welding gun according to claim 1, wherein said welding torch comprises a tungsten electrode and a ceramic nozzle supplied with portective gas and is removable, the connection of electric wires, gas conduits, and cooling water ducts being achieved simply by fixing said torch.

7. A welding gun according to claim 1, wherein said torch is a plasma torch.

8. A device according to claim 1, comprising means for the measurement of rotations, which means consist of a micro-bulb and a photocell inserted in said gun body, separated by a transparent streaked disk, integral with said movable block.

9. A welding gun according to claim 1, further comprising a device for centering said welding torch with respect to tubes to be welded, said device comprising a centering base about which said gun can pivot so as to be parallel with the welding plane, while providing access to a removable punch adapted to position said centering base on a tube to be welded, and mechanical means for locking and unlocking said base.

10. A gun device according to claim 9, wherein said centering base is carried by two crossed rulers and/or comprises a planet carriage for said removable punch.

11. A welding gun according to claim 1 equipped with a device for supplying a feed metal wire, said gun comprising a series of annular members through which passes a shaft carrying said torch, a gear speed reducer connected to said flat torque motor driving said torch, and a further flat torque motor, stationary and of annular shape, adapted to drive said metal wire.

* * * * *